July 7, 1925.
W. WESTBURY
METHOD OF DRAWING GLASS CYLINDERS
Filed Sept. 26, 1921
1,545,222
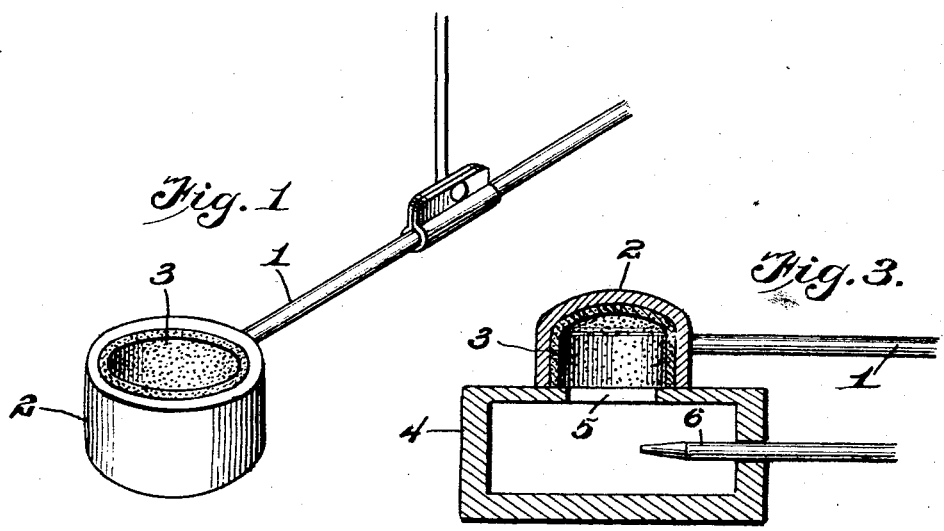
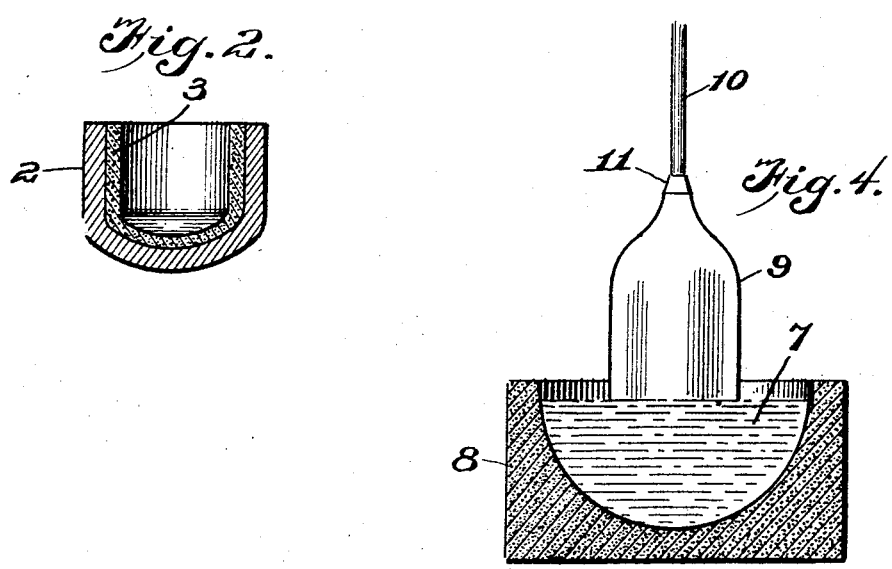
Inventor:
William Westbury,
By
C. C. Hines,
Atty.

Patented July 7, 1925.

1,545,222

UNITED STATES PATENT OFFICE.

WILLIAM WESTBURY, OF CANEY, KANSAS, ASSIGNOR TO LAURA ANNA WESTBURY, OF INDEPENDENCE, KANSAS.

METHOD OF DRAWING GLASS CYLINDERS.

Application filed September 26, 1921. Serial No. 503,321.

*To all whom it may concern:*

Be it known that I, WILLIAM WESTBURY, a citizen of the United States, residing at Caney, in the county of Montgomery and State of Kansas, have invented new and useful Improvements in Methods of Drawing Glass Cylinders, of which the following is a specification.

This invention relates to a method of drawing glass cylinders for the production of window glass therefrom.

In the art of drawing glass cylinders, two specifically different methods are commonly employed. In one method the cylinder is drawn from a charge of glass contained in a "doghouse" or extension from a melting furnace in which a main body of glass is melted, the molten glass flowing as needed from the furnace to the doghouse through a connecting channel, whereby the glass in the doghouse is maintained at a more or less constant level for use. An objection to this method is that, owing to various causes, it is difficult to keep the charge in the doghouse free from impurities, with the result that a large amount of waste of glass occurs, and there is a large amount of time and labor lost, from the drawing of imperfect cylinders. In the other process referred to, the cylinder is drawn from a charge of glass contained in a heated drawing pot, into which the charge of glass is ladled from the melting furnace. This second process is advantageous over the first in that it allows better cylinders to be drawn, since the ladler may take from the melting furnace glass substantially free from impurities. It is customary in such second process, however, to employ an ordinary iron ladle which is heated to a sufficient temperature to prevent the glass from initially chilling and adhering to the walls thereof, usually to a temperature sufficiently high to melt out the aftermath, but never to a temperature sufficiently high to store up enough heat to keep the glass liquid during an entire ladling period, which would be impossible with the use of an ordinary metal ladle. In some cases the use of an internal refractory lining for such ladles has been suggested, for the purpose of protecting the metal ladle body from rapid disintegration under the intense heat of the molten glass, which ladles have been preliminarily heated for the purpose described by either disposing them in normal position upon a small heating kiln and transmitting heat through the metal pot body to the refractory lining, or by exposing the ladle to the heat within the large area of the heating chamber of a glass melting kiln. The main idea of such refractory linings as heretofore employed, however, has been to protect the pot body against excessive heat, and to withstand a temperature high enough only to prevent initial chilling of the glass, and not for the purpose of being heated to a concentrated degree and of storing up therein a sufficiently high degree of heat to maintain the glass in liquid condition during the entire ladling period; nor could such ladles be heated to a temperature sufficient to maintain the glass in liquid condition during an entire ladling period without disintegration or within any reasonable period of time by any of the methods of heating them commonly used. It has therefore not been customary or possible to heat the ladle except to a limited degree above the minimum melting temperature of the glass, and to keep the margins of the charge in the ladle from congealing when coming into contact with the walls of the pot, the amount of heat stored being insufficient to compensate for natural cooling losses when the pot is exposed during the transfer period or for keeping the charge liquid at or above drawing temperature during the full ladling period. As a consequence, the portions of the glass charge contacting with the walls of the ladle congeal in the form of a film which adheres to said walls, and the adjacent portions of the charge are cooled below proper drawing temperature. The result is that a certain proportion of the glass cannot be drained from the ladle because it solidifies and adheres thereto, while a certain additional proportion cannot be used because it is too cold for use and, if used, would form lines in the cylinder. The amount of glass thus lost and required to be melted from the ladle ordinarily amounts to about 135 lbs. in a ladle of 600 lbs. charge capacity. To this loss must be added the aftermath (chilled glass) usually about 130 lbs. remaining in the pot at the end of the draw, which must be remelted; also the waste from the cap and hole ends of the cylinder and the glass remaining in the bait. Thus while this second process allows a cylinder of better grade glass to be drawn, a great waste occurs through the loss of a material portion of the charge and the reduction in the size (length) of the cylinder which may be drawn therefrom. The necessity of remelting large quantities of waste glass also entails additional time, labor and expense.

The object of my present invention is to provide an improved method, whereby all the advantages of pot drawing may be preserved, while at the same time losses due to waste of the kinds mentioned will be avoided or reduced to a material degree, thus enabling increased production of superior glass to be obtained at much less cost per cylinder.

In the accompanying drawing,—

Figure 1 is a perspective view of a ladle employed in my improved process.

Figure 2 is a cross-section through the bowl thereof.

Figure 3 is a view illustrating the operation of heating the ladle prior to use.

Figure 4 is a view of the final step, showing a cylinder being drawn.

In carrying my invention into practice, I employ a ladle comprising a suitable manipulating handle 1 provided with a bowl 2 having a lining 3 of refractory material. This lining 3 is made, preferably, of fireclay capable of sustaining and storing up a heat somewhat greater than that to which the glass employed is melted. When so heated, this material will possess the property of keeping the portions of the glass in direct contact therewith liquid and at proper pouring temperature, preventing any material proportion of the glass from chilling and adhering thereto during the transfer period.

In the operation of drawing a glass cylinder, the ladle, constructed as above described, is first heated so that the temperature of its highly refractory lining 3 will be at least equal to and preferably above the temperature of the molten glass to be ladled thereby from the melting furnace. Any suitable mode of heating the ladle bowl and its refractory lining may be employed, but that disclosed herein is found to be the most satisfactory. In carrying out this step, the bowl of the ladle is placed in inverted position, as shown in Figure 3, upon the top of a heating furnace 4, which furnace is provided in its top with an opening 5 of less diameter than the mouth of the ladle bowl and over which the inverted ladle bowl is disposed, so that the mouth of the ladle is closed except through the connecting opening 5 between the same and the furnace, whereby the flames from a gas or other burner 6 may be concentrated wholly in the ladle bowl and caused to impinge directly against refractory lining 3 to heat the same to the intended high temperature. By thus concentrating the heat within the ladle bowl and directly projecting the flames against the refractory lining the latter may be heated to the high degree necessary, which would be impossible within a reasonable limited time by the use of other methods of heating, as by placing the ladle in normal position over a furnace and attempting to heat the lining through the ladle body, or by disposing the ladle in the large area of the heating space of an ordinary melting furnace.

The ladle with its highly refractory lining so heated, is then employed for dipping up a charge of glass from a body of molten glass in a suitable melting furnace. This charge of glass 7 is transferred by means of the ladle to a drawing pot 8, as shown in Figure 4, from which charge the glass cylinder 9 is then drawn in the usual way by means of an ordinary cylinder drawing apparatus including a drawing tool 10 having the usual bait 11 to which the glass adheres. In thus drawing the cylinder 9, the usual practice of forming the neck or novel and cap and supplying air to the interior of the cylinder is carried out in accordance with the general practice employed in the machine drawing of glass cylinders. Each cylinder is then sub-divided in the ordinary or any approved way and flattened out for the production of window glass.

By the mode of operation above described, great advantages are obtained over the ordinary method of pot drawing, in which the charges of glass, from which successive cylinders are to be drawn, are successively ladled from a melting furnace into a drawing pot. In the first place, as the refractory lining 3, which protects the ladle bowl body 2 from disintegration, is heated so as to store up heat to a temperature equal to or exceeding that of the molten glass, chilling of the glass charge in the region of the wall of the bowl is prevented. This keeps practically the entire charge of glass within the ladle in such a liquefied state as to be poured out and thoroughly drained into the drawing pot 8, leaving little or no residue to be subsequently melted out. As a result, the usual waste of approximately 135 lbs. remaining in the ladle of a charge capacity of 600 lbs., is avoided, as substantially the entire body of glass may be used, with the avoidance also of the trouble and expense of melting out a large proportion of chilled glass. Furthermore, as the glass charge 7 supplied to the pot 8, is of a higher and more uniform temperature throughout, liability of cooling thereof to a point below drawing temperature during the whole of the drawing period is materially reduced, thus enabling all or the greater amount of the glass charge contained in the pot to be used in the drawing of the cylinder, with the result that a better and longer cylinder may be drawn and little or no glass is left in the form of an aftermath which must be ordinarily melted out at further cost of labor and expense. My improved process, therefore, possesses a three-fold advantage over ordinary pot drawing processes, firstly, in preventing or reducing the waste of glass commonly resulting from chilling of glass in the ladle; secondly, in preventing or reducing the amount of glass left remaining in the pot, and which must be melted out as an aftermath; and, thirdly, in enabling better and longer cylinders to be drawn, and, consequently, the production of window glass to be greatly increased. By my method a very large proportion of the ordinary amount of waste is prevented, leaving substantially only that occurring unavoidably in burning off or otherwise removing the cap and hole ends of the cylinder preparatory to the take-down action.

It will, of course, be understood that any suitable type of furnace 4 for heating the ladle may be employed, and also that any suitable type of drawing pot 8 may be used, such as a single or double reversible pot in accordance with common practice.

Having thus fully described my invention, I claim:—

1. The herein-described method of drawing glass cylinders, which consists in providing a ladle having a glass receiving chamber internally lined with a highly refractory material capable of being heated without disintegration to a temperature above the temperature of a charge of liquid glass at drawing temperature and of storing up such a degree of heat therein, heating such ladle while in inverted position by the application of flames concentrated within the ladle and projected from below directly against said lining so as to apply to and store up in such lining a degree of heat sufficient to maintain portions of a glass charge contained in said chamber and lying in contact with said lining in liquid condition during an entire ladling period, filling said ladle with a charge of molten glass at a temperature suitable for drawing a cylinder therefrom, pouring such charge into a heated drawing pot during a period while the portions of the charge in contact with the lining are kept liquefied and above congealing point by the abstraction by the charge from said lining of the heat stored therein, and then drawing a cylinder from such charge.

2. The herein-described method of drawing glass cylinders, which consists in providing a ladle having a glass receiving chamber internally lined with a highly refractory material capable of being heated without disintegration to a temperature above the temperature of a charge of liquid glass at drawing temperature and of storing up such a degree of heat therein, heating such ladle by projecting flames into said chamber while the ladle is inverted and closed against the escape of the flames so as to concentrate the flames from a source below directly against said lining and to store therein a degree of heat sufficient to maintain portions of a glass charge contained in the chamber and lying in contact with the lining in a liquid condition during an entire ladling period, filling said ladle with a charge of molten glass at a temperature suitable for drawing a cylinder therefrom, pouring such charge into a heated drawing pot during a period while the portions of the charge in contact with the lining are kept liquefied and above congealing point by the abstraction by the charge from said lining of the heat stored therein, and then drawing a cylinder from such charge.

3. The herein-described method of drawing glass cylinders, which consists in providing a ladle having a glass receiving chamber internally lined with a material of a high degree of refractivity capable of being heated without disintegration to a temperature above the temperature of a charge of glass at drawing temperature and of storing up a degree of heat therein sufficient to maintain the charge liquefied during a full ladling period, disposing said ladle in inverted position over a furnace having a flame opening of less diameter than the ladle bowl, heating such ladle by projecting flames from the furnace into the ladle bowl and directly against the refractory lining, whereby through such storage of the heat within the bowl and impingement of the flames directly against the lining the latter may be heated to the designated high temperature within a reasonable period of time, filling said ladle with a charge of molten glass at a temperature suitable for drawing a cylinder therefrom, pouring such charge into a heated drawing pot during a period while the portions of the charge in contact with the refractory lining of the ladle are kept liquefied and above congealing point by the abstraction by the charge from said lining of the heat stored therein, and then drawing a cylinder from the charge.

In testimony whereof I affix my signature.

WILLIAM WESTBURY.